United States Patent
Trimpe et al.

[15] 3,698,485
[45] Oct. 17, 1972

[54] TILLAGE DEVICE

[72] Inventors: Clarence W. Trimpe; Roy A. Beldon, both of Seymour, Ind.

[73] Assignee: Rotary Hoes Ltd.

[22] Filed: Aug. 3, 1970

[21] Appl. No.: 60,597

Related U.S. Application Data

[63] Continuation of Ser. No. 702,325, Feb. 1, 1968, abandoned.

[52] U.S. Cl. ................172/65, 172/66, 172/112, 172/123, 172/419
[51] Int. Cl. ................A01b 49/02, A01b 33/00
[58] Field of Search........172/65, 63, 118, 66, 42, 49, 172/122, 123, 112, 419

[56] References Cited

UNITED STATES PATENTS

| | | | |
|---|---|---|---|
| 3,348,619 | 10/1967 | Reynolds et al. | 172/66 |
| 229,505 | 6/1880 | Weatherford | 172/65 |
| 1,880,113 | 9/1932 | Smith | 172/65 |
| 2,920,586 | 1/1960 | Negreiga | 172/65 X |
| 3,185,220 | 5/1965 | Tanoue | 172/66 |
| 2,539,136 | 1/1951 | Hite | 172/65 |
| 2,364,449 | 12/1944 | Jones | 172/65 |
| 2,959,231 | 11/1960 | Hellman | 172/42 |

FOREIGN PATENTS OR APPLICATIONS

| | | |
|---|---|---|
| 739,778 | 8/1943 | Germany |
| 1,224,030 | 6/1960 | France |
| 1,281 | 3/1879 | Great Britain |
| 1,149,802 | 6/1967 | Great Britain |
| 587,114 | 1/1959 | Italy |
| 934,551 | 3/1948 | France |

*Primary Examiner*—Robert E. Pulfrey
*Assistant Examiner*—Stephen C. Pellegrino
*Attorney*—Hofgren, Wegner, Allen, Stellman & McCord

[57] ABSTRACT

A power driven, rotary soil tillage device in which a driven shaft having spaced rotary tillage members with soil engaging blades is provided with soil erupting chisel point members that extend from a point above and behind the driven shaft, downwardly and forwardly and terminate forward of and below the cylinder of rotation of the blades, so that the blades may work to the depth for forming a seed bed and the chisel point members erupt soil upwardly from below seed bed depth into the rotary tillage members where it is broken into an acceptable tilth. Independent adjustment of the depth of operation of the blades and of the chisel points permits optimum operation under varying soil conditions.

14 Claims, 5 Drawing Figures

TILLAGE DEVICE

CROSS-REFERENCE TO RELATED APPLICATION

This is a continuation of our copending application Ser. No. 702,325, filed Feb. 1, 1968 for Tillage Device now abandoned.

BACKGROUND OF THE INVENTION

Rotary tillage devices are extremely popular, and operate with great efficiency in certain types of soil and in relatively shallow tillage. However, in extremely heavy soil, or in very deeply baked and dried clay soil, or where it is desirable to till deeper than about 6 to 8 inches, the power required for operating a rotary tillage device becomes excessive.

There have been various efforts to combine rotary tillage devices with fixed tillage devices to permit deeper tillage than is practical with conventional rotary tillage devices; but none of these efforts has proved to be successful.

Prior to the present invention there has been no rotary tillage device available either with or without auxiliary fixed tillage elements, which is satisfactory for deep tillage, for tillage in deep baked clap soil, for breaking impervious layers that are produced by silting, or for rupturing the hardpan which is produced by conventional agricultural methods a few inches below ground level.

SUMMARY OF THE INVENTION

In accordance with the present invention, a conventional rotary tillage device has a driven shaft on which are mounted a plurality of rotary tillage members having soil engaging blades the outer extremities of which are generally parallel to the shaft. Associated with the rotary tillage members are soil erupting chisel point members which have generally upright shanks secured above and behind the rotary shaft, and each chisel point member has a tooth portion that extends downwardly and forwardly and terminates in a pointed tip which is ahead of and below the cylinder of rotation described by the blades. The rotary tillage blades may be adjusted to the desired depth of a seed bed in order to perform the very fine tillage necessary for that purpose, while the chisel point members erupt soil from below seed bed depth upwardly so as to open up the soil below the seed bed in the manner of a deep, chisel point cultivator.

Preferably the tips of the chisel point members are in a position substantially forward of a vertical plane through the driven shaft, so that soil erupted by the chisel point members is forced upwardly into the working sector of the cylinder of rotation described by the blades where it is engaged by the blades and broken into an acceptable tilth.

In the specific form of the apparatus here disclosed, the rotary tillage members are in pairs with the members of each pair having soil engaging blades that extend toward each other and have their adjacent ends a short distance apart, and each chisel point member extends diagonally between the ends of the blades and through the working sector of the cylinder of rotation described by the blades. However, the latter construction is not essential to perform the basic dual cultivation operation which is the principal advantage of the present apparatus.

The chisel points may be used to erupt soil to a depth of about a foot, and the erupted soil passes upwardly where it is broken up by the rotary tillage blades which may be set, for example, for tilling to a depth of about 4 to 6 inches from the original ground level.

The chisel point members are mounted for vertical adjustment, so that the pointed tips may be positioned at different distances below ground level and below the working depths of the rotary blades. Assuming the blades to have a diameter $d$ the chisel points may be adjusted to bring their tips into a plane between about $0.25d$ and about $0.5d$ below a plane tangent to the bottom of the cylinder of rotation of the blades. This variation in the depth of operation of the chisel points permits the machine to be set for varying operating conditions. In addition, the rotary tillage apparatus is vertically adjustable to vary the depth cultivation by the rotary tillage blades. The independent depth adjustment of the chisel points and the rotary tillage blades permits optimum operation of the entire apparatus under widely varying conditions, as will be described in more detail.

The tips of the chisel point members preferably are located a distance of approximately $0.5d$ forward of a vertical plane which is tangent to the front of the cylinder of rotation of the blades.

The angle of the chisel point members is such that a straight line from the tip of the chisel point tangent to the underside of the shaft on which the rotary blades are mounted forms an angle which is approximately 40° below the horizontal, plus or minus 10°.

The shanks of the chisel points preferably pass between the rotary blades, so that any trash such as weeds, corn stalks, roots or the like which are picked up by the chisel points are torn from the shanks of the chisel point members by the action of the rotary blades so as to prevent clogging and jamming of the unit.

The apparatus has a variety of advantages, among which are the following:

1. Ground which is broken about a foot ahead of the rotary tillage blades is erupted into the path of forward movement of the blades where it is contacted by the blades and broken down by them, so that the blades do not have to break the ground initially. Consequently the driven shaft and the blades may be of a lighter construction than could otherwise be used.

2. The rotary tillage blades may function only to prepare the depths of soil required for a seed bed, with the heavy breaking of the soil below the seed bed performed by the chisel points.

3. By adjusting the depth of the chisel points, ground can be broken deeply by the chisel points to a desired depth below a seed bed which is prepared by the action of the rotary tillage blades.

4. The hardpan which is formed by conventional tillage methods using either a rotary tillage member or a fixed tillage blade can be broken by the chisel points at the same time that the previously cultivated surface soil above the hardpan is broken into a seed bed by the rotary blades.

5. In rotary tillage devices of the present type the rotary tillage blades, driven off the tractor power take-off, impart a forward thrust which supplements the tractive force applied by the tractor driving wheels. By properly balancing the depth of cut of the rotor blades with the depth of operation of the chisel points, and the number of rotor blades with the number of chisel points, it is possible to cause the rotor thrust derived from the power take-off to provide all the driving force for moving the tillage apparatus forward, so that the entire traction of the tractor driving wheels is available to provide the required power for uphill work, and tearing through obstructions to the rotor blades and the tines caused by locally dense areas of soil, roots, etc.

Accordingly, the principal object of the invention is to provide an improved tillage apparatus.

Another object of the invention is to provide a tillage apparatus in which soil is first erupted by chisel point tillage members which are constructed and arranged to erupt soil into the path of forward movement of rotary tillage blades.

Yet another object of the invention is to provide a tillage device which combines the operating advantages of a chisel point plow with those of a rotary tillage unit.

Still a further object of the invention is to provide a tillage device in which the forward thrust imparted by the rotor blades may be correlated with the depth of cultivation by the chisel points to offer optimum utilization of available power from the tractor under varying conditions of operation.

DETAILED DESCRIPTION OF THE INVENTION

Figure 1:
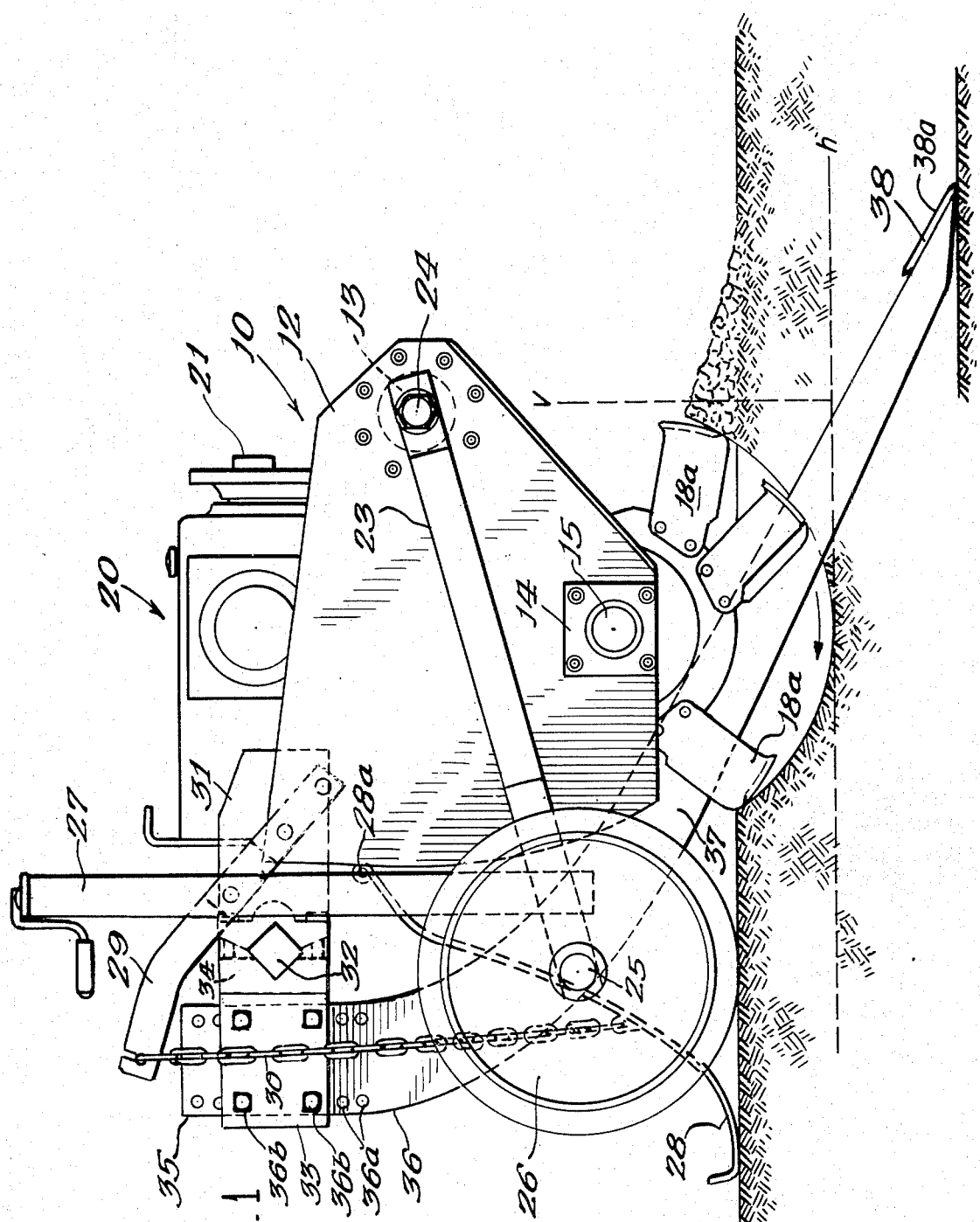
FIG. 1 is a side elevational view of the apparatus of the invention, with the relationship between the original ground level, the soil erupted by the chisel point, and the working sector of the rotary blades illustrated generally diagrammatically and without attempting to illustrate accurately the flow of soil upwardly along the chisel point and around the blades.
Figure 2:
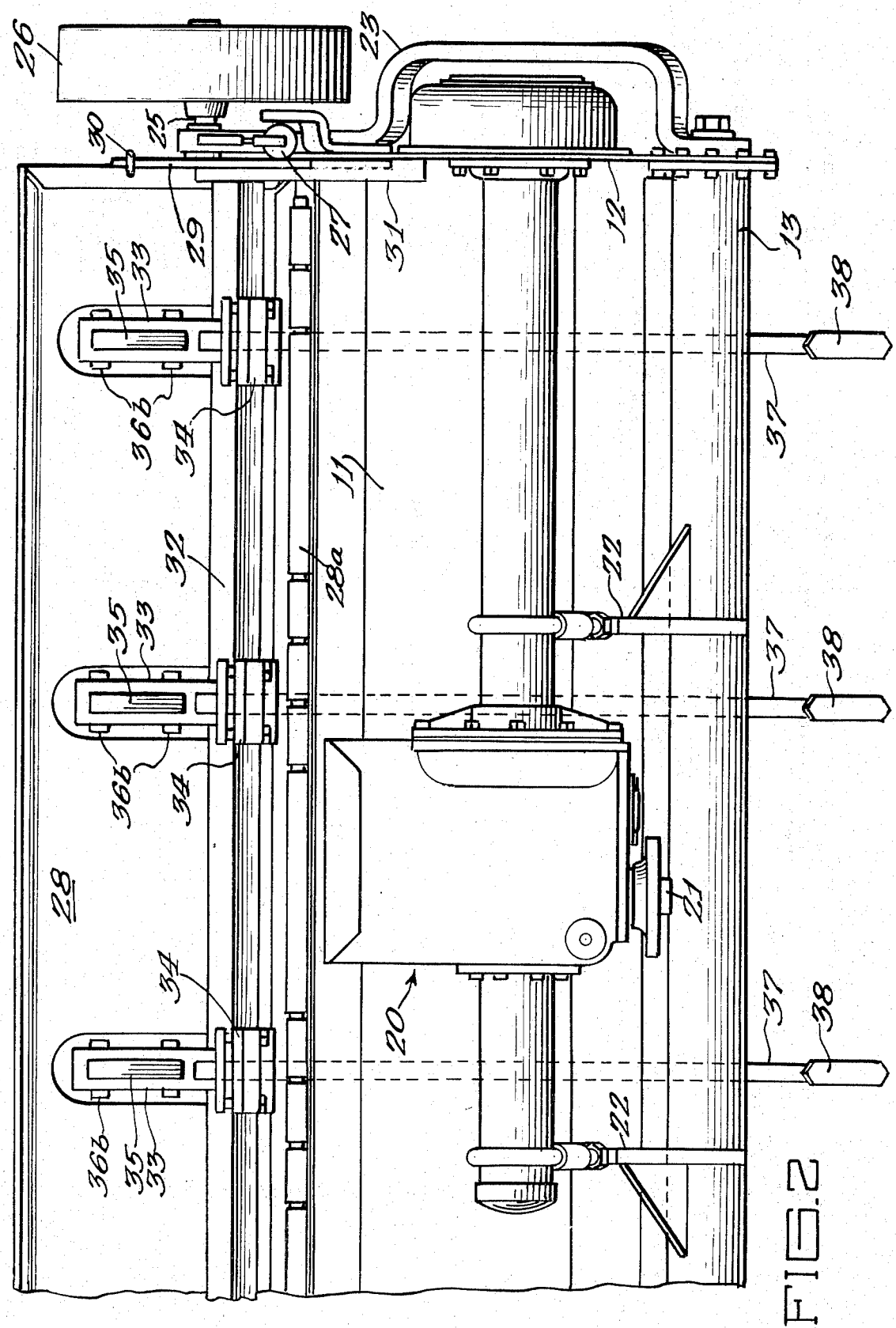
FIG. 2 is a fragmentary plan view of the apparatus.

In the preferred embodiment of the invention as illustrated in the accompanying drawings, a soil tillage device includes a mobile frame, indicated generally at 10, which is best seen in FIGS. 1 and 2 to include a main cross frame plate 11 at the two ends of which are end frame plates 12 the front portions of which are connected by a front stay tube 13. Journal boxes 14, such as the one illustrated in FIG. 1, are mounted on the end plates 12, and a rotor 15 provides a rotatable transverse shaft journalled in said journal boxes.

Figure 3:
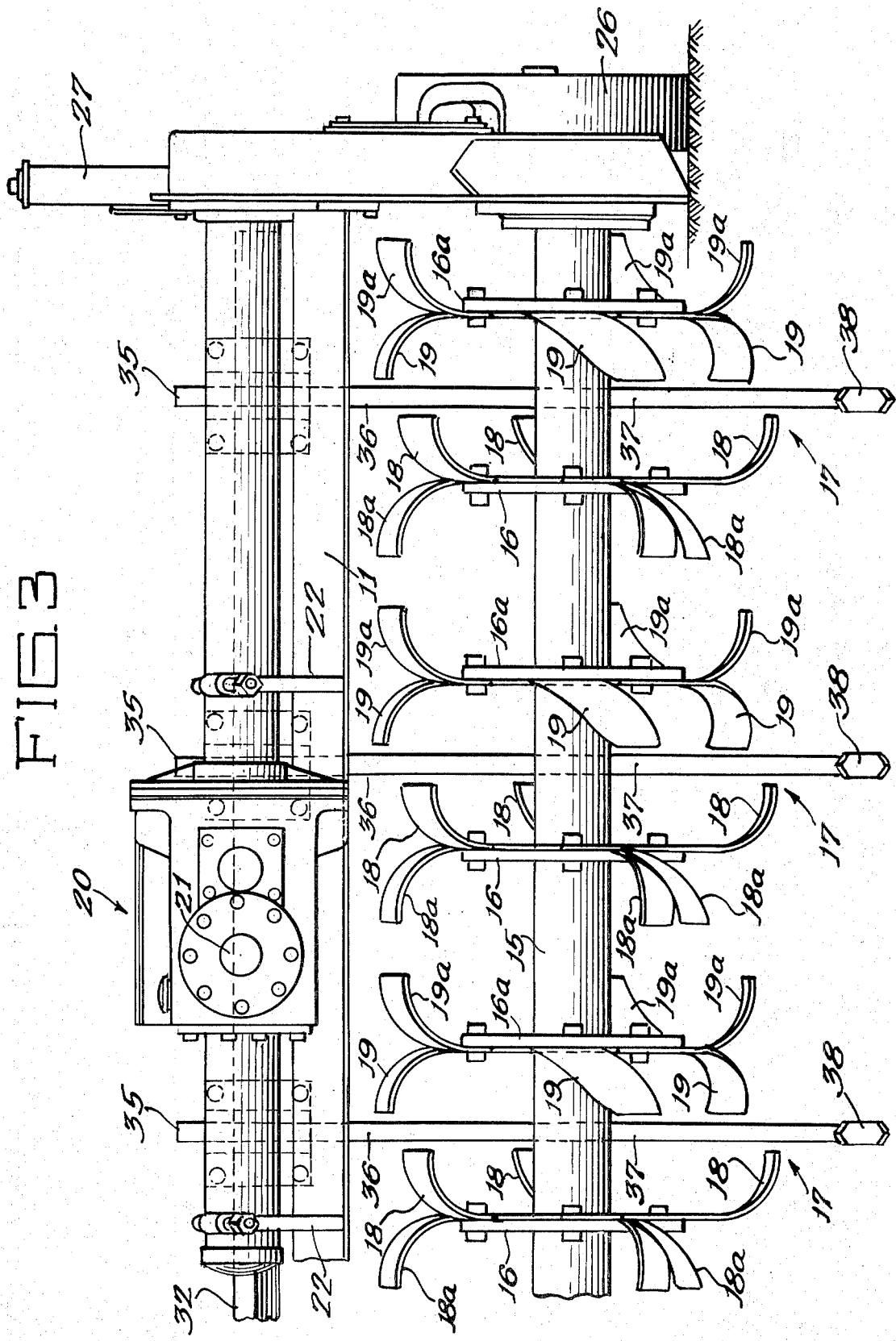
FIG. 3 is a fragmentary front elevational view of the apparatus.
Figure 4:
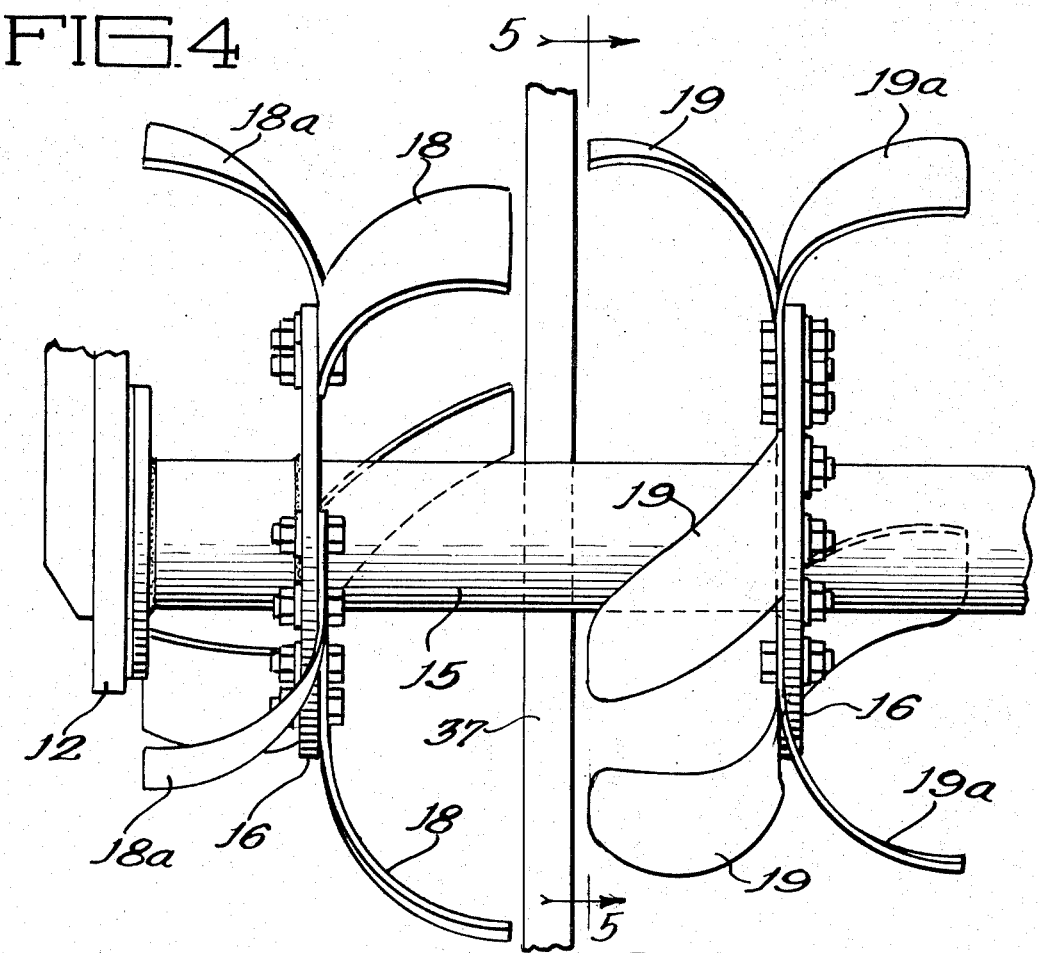
FIG. 4 is a fragmentary view on an enlarged scale illustrating the relationship between a chisel point member and the rotary tillage blades.
Figure 5:
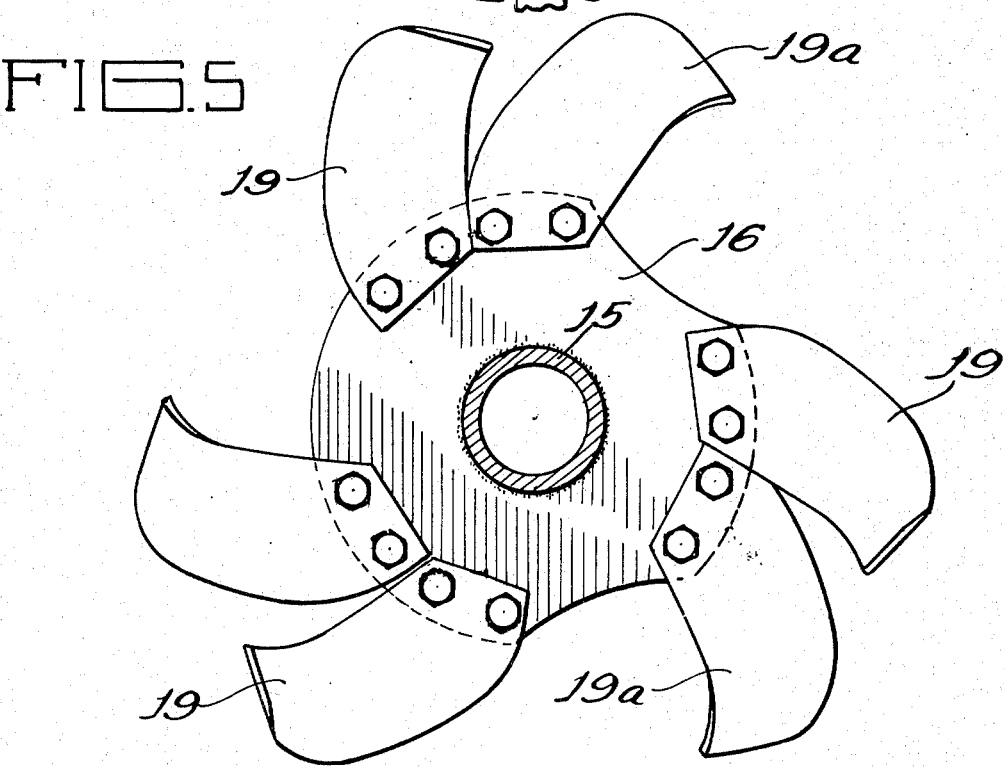
FIG. 5 is a section taken substantially as indicated along the line 5—5 of FIG. 4.

Welded at intervals along the rotor 15 are pairs of mounting discs 16 and 16a which support a plurality of pairs of rotary tillage members, indicated generally at 17. Each pair of tillage members consists of soil engaging blades 18 mounted on the disc 16 of a pair of discs and soil engaging blades 19 which are mounted on disc 16a of said pair of discs; with the blades 18 and 19 extending toward each other generally parallel to the shaft 15 and having their adjacent ends a short distance apart as seen in FIG. 3. In addition to the pairs of blades 18 and 19, each of the brackets 16 support blades 18a which extend in a direction generally opposite from that of the blades 18, while the brackets 16a support blades 19a which extend toward the blades 18a.

Mounted above the main plate 11, and supported partly upon said plate and partly upon the end plate 12 and tubular front cross frame member 13 is a drive system, indicated generally at 20, which includes an input shaft 21 that is adapted to be connected through a conventional slip joint with a tractor power take-off of a farm tractor for the purpose of driving the shaft 15. Since the drive system is conventional, and is no part of the present invention, it is not described further.

Brackets 22 which connect the drive means 20 with the forward transverse hollow frame member 13 are also adapted to receive mounting arms (not shown) by means of which the entire unit is mounted upon pivoted support arms at the rear of the tractor; and such support arms may be raised and lowered through the medium of the tractor hydraulic system, in the conventional manner, to raise and lower the unit as required in operation.

As best seen in FIGS. 1 and 2, at opposite ends of the frame 10 are pivoted wheel mounting arms 23 which are swingably mounted at 24 upon the ends of the front tubular frame member 13, and as best seen in FIG. 1 the mounting arms 23 extend diagonally downwardly and rearwardly and have spindles 25 at their rear ends to receive wheels 26. Manually operable screw jack means 27 are provided for adjusting the position of the wheel mounting arms 23 so that the vertical position of the wheels 26 may be correlated with the depth to which the shaft 15 which carries the rotary tillage blades is adjusted relative to ground level.

At the rear of the unit a shield 28 is pivotally mounted so that it may be adjusted to any of a variety of positions with respect to the ground level and the rotary tillage blades 18–19, etc. and support arms 29 carry chains 30 by means of which the shield 28 may be supported in any desired position.

The unit as heretofore described is a typical rotary tillage machine of a type manufactured for many years by Howard Rotavator Company, Inc., assignee of the present patent application. It differs from commercial rotary tillage machines manufactured by Howard Rotavator Company, Inc. only in the spacing of the discs 16 and 16a on the driven shaft 15 so as to position the rotary tillage blades 18 and 19 for cooperation with the chisel point members as will now be described.

Mounted at the rear of the frame 10 are rearwardly extending brackets 31 which carry a transverse, rectangular tool bar 32 on which a set of apertured brackets 33 are adjustably secured by means of clamps 34. Mounted in each of the brackets 33 is a soil-erupting chisel point member 35 which includes a generally upright shank 36 that curves downwardly and forwardly and merges into a diagonally downwardly and forwardly extending tooth portion 37 at the tip of which is a replaceable chisel tip wear plate 38. Each chisel point shank 36 has two series of holes 36a to receive mounting bolts 36b, so the chisel points are vertically adjustable in the brackets 33.

As best seen in FIG. 3, each of the chisel point members 35 has its tooth portion 37 extending between the ends of the adjacent, closely spaced blades 18 and 19. The clamps 34 may be adjusted lengthwise of the tool bar 32 in order to position each of the chisel point members 35 in correct relationship to the blades 18 and 19 with which it is associated.

For optimum results, it is desirable that the chisel tip wear plates 38 occupy a certain relationship to the blades 18 and 19 and to the "working sector" of the cylinder of rotation of the blades. As the shaft 15 rotates, the outer extremities of the blades describe a cylinder of rotation, and the working sector of the cylinder of rotation constitutes that segment of the cylinder which is below ground level when the machine is in operation. Designating the diameter of the cylinder of rotation as $d$, the adjusting means afforded by the clamps 33 permits the chisel points 35 to be located with their chisel point blades 38 a selected distance below a horizontal plane $h$ tangent to the bottom of said cylinder of rotation, with the selected distance being adjustable between approximately $0.25d$ and $0.5d$.

The chisel tip wear plates 38 have their tips forward of a vertical plane $v$ which is tangent to the front of the cylinder of rotation of the blades by a distance of approximately $0.5d$.

Furthermore, the angle of the tooth portion 37 of each chisel point member 35 is of considerable significance in the satisfactory operation of the unit. This angle is most easily stated by measuring the angle to the horizontal of the top surface 38a of the chisel point blade 38; and this angle should be approximately 30° plus or minus 5°.

As seen in FIG. 1, the tooth portion 37 of each chisel point member extends through the working sector of the cylinder of rotation of the blades, so that erupted soil which passes upwardly along the tooth portions of the chisel point members is engaged by the blades and worked by them. Likewise, as the tillage device is moved forwardly the soil erupted by the chisel point members is in the path of forward movement of the rotary tillage blades, so that the rotary blades engage the erupted soil and break it into an acceptable tilth. At the same time, any trash such as corn stalks, weeds, roots, or the like which is forced upwardly along the chisel point members by the forward progress of the unit is engaged by the rotary blades in a rearward part of their cylinder of rotation so that the trash is torn loose from the chisel point members to prevent it from jamming the blades or dragging on the chisel point. The direction of rotation of the rotary tillage members is illustrated by the arrow in FIG. 1, and it is seen that in the rearward part of the cylinder of rotation of the blades they have a generally upward component of movement which tends to lift trash off the chisel point member, rather than jamming it downwardly onto the chisel point members as would be the case if the blades rotated counterclockwise rather than clockwise as viewed in FIG. 1.

As previously indicated, the depth to which the rotary tillage members cultivate the soil may be adjusted by moving the ground wheels, while the depth to which the soil erupting members penetrate the soil below the working sector of the rotary tillage members may be adjusted by means of the adjusting clamps. This independent adjustability of the rotary tillage members and the soil erupting members permits optimum operation of the apparatus under varying conditions, and in particular it permits the best balance of driving force between that provided by the tractor driving wheels and that provided by the tractor power take-off acting through the rotary tillage members which give a forward thrust as they rotate in the soil.

The forward thrust imparted by the rotor is directly related to the number of blades on the shaft, the length of that portion of each blade which extends parallel to the shaft, the depth of cut of the blades and the shear strength of the soil.

The drawbar pull required to pull the soil erupting members through the soil depends upon their shape, the number of them in the apparatus, the depth to which they penetrate the soil, and the shear strength of the soil.

Apparatus of the present type is made in various different widths; and various widths have different numbers of rotary blades and different numbers of soil erupting members. With any particular combination of rotary blades and soil erupting members it is possible by balancing the depth of cut of the rotary blades and the depth of penetration of the soil erupting members to arrive at a point of balance in which the entire driving force for the apparatus comes from the power take-off through the rotary blades, so that the entire drawbar pull of the tractor is available to boost the apparatus through obstructions, help it on uphill runs, etc. Operating the apparatus in this manner permits the use of a tractor of relatively lower power requirements, and thus a less expensive tractor, than would be necessary if substantially the entire tractive effort required to draw the soil erupting members through the soil had to be derived from drawbar pull.

Thus, independent adjustability of the depth of rotary cultivation and of the depth of penetration by the soil erupting members offers advantages in addition to those accruing from the great flexibility of operation which is offers in soil cultivation.

The foregoing detailed description is given for clearness of understanding only and no unnecessary limitations should be understood therefrom as modifications will be obvious to those skilled in the art.

We claim:

1. A power driven rotary soil tillage device comprising, in combination:
   a mobile frame;
   a rotatable transverse shaft on said frame;
   means for driving said shaft from a power source;
   a plurality of rotary tillage members on said shaft, the members having blades which include radially extending portions terminating in outer end portions that extend generally parallel to the shaft, said outer end portions of said blades describing a cylinder of rotation about the shaft when the latter is rotated, with the lower part of said cylinder affording a working sector in which the blades penetrate and break up soil into a fine tilth to a depth for forming a seed bed, said blades moving downwardly through the front of said working sector;
   and transversely spaced soil erupting members operatively associated with the rotary tillage members, each said soil erupting member having a shank which is effectively rigidly secured to the frame behind the shaft and merges into a tooth portion that extends diagonally downwardly and forwardly of the device and terminates in a pointed tip which is entirely below a plane tangent to the bottom of the working sector and below the depth for forming a seed bed, and a sufficient distance forward of the vertical median plane of said sector at all times, and the soil erupting member being so shaped that as the device moves forward the tooth portions erupt soil upwardly from below seed bed depth into the path of forward movement of the blades which initially engage the erupted soil in the forward half of the working sector and break said soil into an acceptable tilth, whereby said device may simultaneously prepare a seed bed and break up compacted soil below the level of the seed bed.

2. The device of claim 1 which includes means for adjusting the soil erupting members vertically with respect to the shaft.

3. The device of claim 3 in which the cylinder of rotation has a diameter $d$, and the adjusting means permits the soil erupting members to be located with their tips a selected distance below a horizontal plane tangent to the bottom of the cylinder of rotation of the blades, said selected distance being adjustable between about $0.25d$ and $0.5d$.

4. The device of claim 1 in which the cylinder of rotation has a diameter $d$, and the soil erupting members have their tips forward of a vertical plane tangent to the front of the cylinder of rotation of the blades by a distance of approximately $0.5d$.

5. The device of claim 1 in which the tooth portion of each soil erupting member has a generally horizontal undersurface, and said tooth portion is chisel shaped and has a top surface which diverges upwardly and rearwardly at an angle of about 30° to the horizontal, plus or minus 5°.

6. The device of claim 5 which includes means for adjusting the soil erupting members vertically with respect to the shaft, and said adjusting means permits said members to be located with their tips a selected distance below a horizontal plane tangent to the bottom of the cylinder of rotation of the blades, said selected distance being adjustable between about $0.25d$ and $0.5d$.

7. The device of claim 6 in which the blades have a diameter $d$, and the soil erupting members have their tips forward of a vertical plane tangent to the front of the cylinder of rotation of the blades by a distance of approximately $0.5d$.

8. The device of claim 1 in which the rotary tillage members are arranged in pairs with their outer end portions extending toward each other and having their adjacent ends a short distance apart, and in which a soil erupting member is associated with each pair of rotary tillage members and has its tooth portion positioned between the ends of the blades in the working sector of the cylinder of rotation with the pointed tip of the tooth portion ahead of the working sector, the adjacent ends of the blades being spaced only slightly from the sides of the tooth portion so as to strip trash from the soil erupting members.

9. A power driven rotary soil tillage device comprising, in combination:
   a mobile frame;
   a rotatable transverse shaft on said frame;
   means for driving said shaft from a power source;
   a plurality of rotary tillage members on said shaft the outer ends of which describe a cylinder of rotation about the shaft while the latter is rotated, with the lower part of said cylinder affording a working sector, and said members rotating downwardly through the front of said working sector so as to assist forward movement of the device;
   transversely spaced soil erupting members each having a shank which is rigidly secured to the frame and merges into a tooth portion that extends downwardly and forwardly from the shank and terminates in a pointed tip which is entirely below a plane tangential to the bottom of the working sector and forward of the vertical median plane of said sector at all times, the soil erupting members being spaced apart axially of said shaft;
   means for adjusting the position of the soil erupting members vertically with respect to said rotatable shaft;
   and separate means for adjusting the operative position of the mobile frame relative to the ground surface, whereby the position of the cylinder of rotation relative to the ground surface and the vertical position of the soil erupting members relative to the cylinder of rotation are adjustable according to the prevailing soil conditions and the desired seed bed consistency and whereby the forward thrust imparted by the tillage members can be matched with the pull required for drawing the soil erupting members through the soil.

10. The device of claim 9 in which the tillage members have blades which include radially projecting portions terminating in outer end portions that extend generally parallel to the shaft and the blades are rigidly secured to the shaft, and the tillage members break up soil in said working sector and soil erupted into the path of the blades by said soil erupting members.

11. The device of claim 9 in which the soil erupting members are adjustably mounted on a transverse tool bar to vary the positions of the members longitudinally of the tool bar.

12. The device of claim 9 in which the blades are arranged in pairs having oppositely directed end portions.

13. The device of claim 9 in which the tips are located forward of the forward edge of said working sector.

14. The device of claim 9 in which the tips of the soil erupting members are chisel shaped and each have an upper surface upwardly inclined at about 30° to the horizontal.

* * * * *